US011356963B2

(12) United States Patent
Shi et al.

(10) Patent No.: US 11,356,963 B2
(45) Date of Patent: Jun. 7, 2022

(54) RADIO COMMUNICATION METHOD AND DEVICE

(71) Applicant: Guangdong OPPO Mobile Telecommunications Corp., Ltd., Guangdong (CN)

(72) Inventors: Zhihua Shi, Guangdong (CN); Zhi Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 596 days.

(21) Appl. No.: 16/338,589

(22) PCT Filed: Oct. 27, 2017

(86) PCT No.: PCT/CN2017/108086
§ 371 (c)(1),
(2) Date: Apr. 1, 2019

(87) PCT Pub. No.: WO2019/080111
PCT Pub. Date: May 2, 2019

(65) Prior Publication Data
US 2021/0377882 A1    Dec. 2, 2021

(51) Int. Cl.
*H04W 56/00* (2009.01)
*H04L 1/16* (2006.01)

(52) U.S. Cl.
CPC ......... *H04W 56/001* (2013.01); *H04L 1/1614* (2013.01)

(58) Field of Classification Search
CPC .......................... H04W 56/001; H04L 1/1614
See application file for complete search history.

(56) References Cited

U.S. PATENT DOCUMENTS 9,385,791 B2    7/2016 Etemad et al.
9,844,086 B2 *  12/2017 Seo ................. H04L 1/1861
(Continued)

FOREIGN PATENT DOCUMENTS

CN      103813460 A     5/2014
WO      2016163071 A1   10/2016

OTHER PUBLICATIONS

3GPP TSG RAN WG1 Meeting NR#3; R1-1715385 Nagoya, Japan, Sep. 18-21, 2017.
(Continued)

*Primary Examiner* — Chi H Pham
*Assistant Examiner* — Vladislav Y Agureyev
(74) *Attorney, Agent, or Firm* — Young Basile Hanlon & MacFarlane, P.C.

(57) ABSTRACT

A radio communication method and device are provided. The method includes: a network device sending first information to a terminal device, the first information including a first bitmap corresponding to a plurality of first synchronization signal blocks, and the first bitmap being used for identifying at least one second synchronization signal block in the plurality of first synchronization signal blocks; the network device obtaining a second bitmap corresponding to at least one second synchronization signal block based on the first bitmap, the second bitmap being used for identifying at least one third synchronization signal block in at least one second synchronization signal block; and the network device sending second information including the second bitmap to the terminal device.

16 Claims, 4 Drawing Sheets

(56) References Cited

U.S. PATENT DOCUMENTS

| | | | | |
|---|---|---|---|---|
| 10,560,937 | B2* | 2/2020 | Zhang | H04W 72/02 |
| 10,931,497 | B2* | 2/2021 | Sheng | H04L 1/1614 |
| 2016/0295499 | A1* | 10/2016 | Tavildar | H04W 8/005 |
| 2018/0098322 | A1* | 4/2018 | Yoon | H04W 72/0446 |
| 2018/0324022 | A1* | 11/2018 | Sheng | H04L 27/2655 |
| 2019/0053234 | A1* | 2/2019 | Cui | H04W 72/0446 |
| 2019/0098589 | A1* | 3/2019 | Chae | H04W 56/0015 |
| 2019/0327732 | A1* | 10/2019 | Yoon | H04W 56/0005 |
| 2019/0357159 | A1* | 11/2019 | Pan | H04W 72/046 |
| 2020/0067755 | A1* | 2/2020 | Pan | H04L 27/2675 |
| 2020/0127726 | A1* | 4/2020 | Gao | H04W 56/001 |
| 2020/0137701 | A1* | 4/2020 | Harada | H04W 56/0015 |
| 2020/0259588 | A1* | 8/2020 | Iyer | H04L 1/0041 |
| 2020/0267670 | A1* | 8/2020 | Åström | H04W 48/10 |
| 2021/0058807 | A1* | 2/2021 | Cui | H04W 24/10 |
| 2021/0289474 | A1* | 9/2021 | Wang | H04L 5/0053 |

OTHER PUBLICATIONS

3GPP TSG RAN WG1 Meeting #90bis; R1-1718058 Prague, CZ, Oct. 9-13, 2017.

Examination Report for EP application No. 17922916.6 dated Feb. 21, 2020.

3GPP TSG RAN WG1 Meeting #90bis; R1-1717030; Prague, Czech Republic, Oct. 9-13, 2017.

3GPP TSG RAN WG1 Meeting #90; R1-1714678; Prague, Czech Republic, Aug. 21-25, 2017.

Communication pursuant to Article 94(3) EPC for EP Application 17922916.6 dated Sep. 3, 2020.

Second Office Action with English Translation for CN Application 201780049119.X dated Oct. 19, 2020.

EP Examination for EP Application 17922926.6 dated May 28, 2020.

English translation of China OA for CN application 201780049119.X dated May 21, 2020.

3GPP TSG RAN WG1 Meeting #90bis; R1-1718458 Prague, CZ, Oct. 9-13, 2017.

3GPP TSG RAN WG1 Meeting #88bis; R1-1704862 Spokane, USA, Apr. 3-7, 2017.

3GPP TSG RAN WG1 NR Ad-Hoc#2 Meeting; R1-1711232 Qingdao, P.R. China, May 27-30, 2017.

3GPP TSG RAN WG1 NR Ad-Hoc#3; R1-1716149 Nagoya, Japan, Sep. 18-21, 2017.

Extended European search report issued in corresponding European application No. 17922916.6 dated Aug. 19, 2019.

* cited by examiner

RADIO COMMUNICATION METHOD AND DEVICE

CROSS-REFERENCE TO RELATED APPLICATION(S)

This application is a 371 application of International Application No. PCT/CN2017/108086, filed on Oct. 27, 2017, the entire disclosure of which is hereby incorporated by reference.

TECHNICAL FIELD

The present application relates to the field of communications, and more particularly, to a radio communication method and device.

BACKGROUND

In a New Radio (NR) system, a network device transmits a synchronization signal block to a terminal device. The synchronization signal block may include a Primary Synchronization Signal (PSS), a Secondary Synchronization Signal, SSS), and a Physical Broadcasting Channel (PBCH). The terminal device may search the SS block within the system bandwidth to obtain a cell Identifier (ID), perform time-frequency synchronization, obtain PBCH information, and perform a Radio Resource Management (RRM) measurement based on SSS and Demodulation Reference Signal (DMRS) of PBCH. In specific transmission, the synchronization signal blocks may be categorized into a synchronization signal block capable of being sent, a synchronization signal block actually transmitted, or a synchronization signal block implementing a specific function.

In the NR system, it is expected to use as less signaling overhead as possible to improve communication performance.

Therefore, how to reduce signaling overhead in an aspect of indication of a synchronization signal block is an urgent issue to be solved.

SUMMARY

Implementations of the application provide a radio communication method and device In a first aspect, a radio communication method is provided. The method includes:

a network device sending first information to the terminal device, herein the first information includes a first bitmap corresponding to a plurality of first synchronization signal blocks, and the first bitmap is used for identifying at least one second synchronization signal block in the plurality of first synchronization signal blocks the network device obtaining a second bitmap corresponding to at least one second synchronization signal block based on the first bitmap, herein the second bitmap is used for identifying at least one third synchronization signal block in the at least one second synchronization signal block; and the network device sending second information including a second bitmap to the terminal device.

In combination with the first aspect, in one possible example of the first aspect, the plurality of first synchronization signal blocks are synchronization signal blocks that the network device is capable of sending to the terminal device at a specific frequency point In combination with the first aspect or any of the above possible examples thereof, in another possible example of the first aspect, at least one second synchronization signal block is synchronization signal block actually transmitted by the network device to the terminal device at a specific frequency point In combination with the first aspect or any of the above possible examples thereof, in another possible example of the first aspect, at least one third synchronization signal block is synchronization signal block used for the terminal device to perform a beam management, a radio link measurement, or a mobility management measurement In combination with the first aspect or any of the above possible examples thereof, in another possible example of the first aspect, obtaining, by the network device, the second bitmap corresponding to at least one second synchronization signal block based on the first bitmap includes:

obtaining a mapping mode of the at least one second synchronization signal block in the second bitmap according to a mapping mode of the at least one second synchronization signal block in the first bitmap;

obtaining the second bitmap by using the determined mapping mode

In combination with the first aspect or any of the above possible examples thereof, in another possible example of the first aspect, a quantity of bits in the first bitmap is equal to the quantity of first synchronization signal blocks and the quantity of bits in the second bitmap is equal to the quantity of second synchronization signal blocks In combination with the first aspect or any of the above-mentioned possible examples thereof, in another possible example of the first aspect, a bit corresponding to each second synchronization signal block of the at least one second synchronization signal block in the second bitmap is contained in the second bitmap according to an arrangement order of the bit corresponding to the each second synchronization signal block in the first bitmap.

In combination with the first aspect or any of the above possible examples thereof, in another possible example of the first aspect, the first bitmap includes a first sub-bitmap and a second sub-bitmap; and the second bitmap includes a third sub-bitmap and a fourth sub-bitmap The first sub-bitmap corresponds to M synchronization signal block sets A, each of which includes at least one first synchronization signal block, and the first sub-bitmap is used for identifying N synchronization signal block sets A including the second synchronization signal block in the M synchronization signal block sets A.

The second sub-bitmap corresponds to the synchronization signal block sets A including the second synchronization signal block, and is used for identifying the second synchronization signal block in the synchronization signal block sets A including the second synchronization signal block The third sub-bitmap corresponds to N synchronization signal block sets B, the N synchronization signal block sets B correspond to the N synchronization signal block sets A in a one-to-one manner, each synchronization signal block set B includes the second synchronization signal block in the corresponding synchronization signal block set A, and the third sub-bitmap is used for identifying S synchronization signal block sets B including the third synchronization signal block in the N synchronization signal block sets B.

The fourth sub-bitmap corresponds to the synchronization signal block sets B including the third synchronization signal block, and is used for identifying the third synchronization signal block in the synchronization signal block sets B.

In combination with the first aspect or any of the above possible examples thereof, in another possible example of the first aspect, a quantity of bits in the first sub-bitmap is equal to M, and the quantity of bits in the second sub-bitmap is equal to the quantity of synchronization signal blocks included in the synchronization signal block set A.

The quantity of bits in the third sub-bitmap is equal to N, and the quantity of bits in the fourth sub-bitmap is equal to the quantity of synchronization signal blocks included in the synchronization signal block set B.

In combination with the first aspect or any of the above possible examples, in another possible example of the first aspect, a bit corresponding to each synchronization signal block set B in the N synchronization signal block sets B is contained in the third sub-bitmap according to an arrangement order of the synchronization signal block set A corresponding to the each synchronization signal block set B in the first sub-bitmap.

The bit corresponding to each second synchronization signal block in the synchronization signal block sets B including the third synchronization signal block is contained in the fourth sub-bitmap according to an arrangement order of the bit corresponding to the each second synchronization signal block in the second sub-bitmap.

In combination with the first aspect or any of the above-mentioned possible examples thereof, in another possible example of the first aspect, among the plurality of indication modes of the at least one third synchronization signal block, a bit overhead by using a second bitmap to indicate the at least one third synchronization signal block is least, or is less than or equal to a predetermined value In combination with the first aspect or any one of the above possible examples thereof, in another possible example of the first aspect, the plurality of indication modes include:

indicating by using the second bitmap; and indicating by carrying a serial-number of the at least one third synchronization signal block.

In a second aspect, a radio communication method is provided. The method includes:

a terminal device receiving first information sent by a network device, herein the first information includes a first bitmap corresponding to a plurality of first synchronization signal blocks, and the first bitmap is used for identifying at least one second synchronization signal block in the plurality of first synchronization signal blocks;

based on the first bitmap, the terminal device determining at least one second synchronization signal block in the plurality of first synchronization signal blocks;

the terminal device receiving second information sent by the network device, herein the second information includes a second bitmap corresponding to the at least one second synchronization signal block, and the second bitmap is used for identifying at least one third synchronization signal block in the at least one second synchronization signal block; and determining the at least one third synchronization signal block in the at least one second synchronization signal block based on the first bitmap and the second bitmap.

In combination with the second aspect, in one possible example of the second aspect, the plurality of first synchronization signal blocks are synchronization signal blocks that the network device is capable of sending to the terminal device at a specific frequency point.

In combination with the second aspect or any of the above possible examples thereof, in another possible example of the second aspect, at least one second synchronization signal block is synchronization signal block actually transmitted by the network device to the terminal device at a specific frequency point.

In combination with the second aspect or any of the above possible examples thereof, in another possible example of the second aspect, at least one third synchronization signal block is synchronization signal block used for the terminal device to perform a beam management, a radio link measurement, or a mobility management measurement.

In combination with the second aspect or any of the above possible examples thereof, in another possible example of the second aspect, determining the at least one third synchronization signal block in at least one second synchronization signal block based on the first bitmap and the second bitmap includes:

obtaining a mapping mode of the at least one second synchronization signal block in the second bitmap according to a mapping mode of the at least one second synchronization signal block in the first bitmap;

obtaining the at least one third synchronization signal block in the at least one second synchronization signal block based on the second bitmap by using a determined mapping mode.

In combination with the second aspect or any of the above possible examples thereof, in another possible example of the second aspect, a quantity of bits in the first bitmap is equal to the quantity of first synchronization signal blocks and the quantity of bits in the second bitmap is equal to the quantity of second synchronization signal blocks.

In combination with the second aspect or any of the above-mentioned possible examples thereof, in another possible example of the second aspect, a bit corresponding to each second synchronization signal block of the at least one second synchronization signal block in the second bitmap is contained in the second bitmap according to an arrangement order of the bit corresponding to the each second synchronization signal block in the first bitmap.

In combination with the second aspect or any of the above possible examples thereof, in another possible example of the second aspect, the first bitmap includes a first sub-bitmap and a second sub-bitmap; and the second bitmap includes a third sub-bitmap and a fourth sub-bitmap.

The first sub-bitmap corresponds to M synchronization signal block sets A, each of which includes at least one first synchronization signal block, and the first sub-bitmap is used for identifying N synchronization signal block sets A including a second synchronization signal block in the M synchronization signal block sets A.

The second sub-bitmap corresponds to the synchronization signal block sets A including the second synchronization signal block, and is used for identifying the second synchronization signal block in the synchronization signal block sets A including the second synchronization signal block.

The third sub-bitmap corresponds to N synchronization signal block sets B, the N synchronization signal block sets B correspond to the N synchronization signal block sets A in a one-to-one manner, each synchronization signal block set B includes the second synchronization signal block in the corresponding synchronization signal block set A, and the third sub-bitmap is used for identifying S synchronization signal block sets B including the third synchronization signal block in the N synchronization signal block sets B.

The fourth sub-bitmap corresponds to the synchronization signal block sets B including the third synchronization signal block, and is used for identifying the third synchronization signal block in the synchronization signal block sets B.

In combination with the second aspect or any of the above possible examples thereof, in another possible example of the second aspect, a quantity of bits in the first sub-bitmap is equal to M, and the quantity of bits in the second sub-bitmap is equal to the quantity of synchronization signal blocks included in the synchronization signal block set A.

The quantity of bits in the third sub-bitmap is equal to N, and the quantity of bits in the fourth sub-bitmap is equal to the quantity of synchronization signal blocks included in the synchronization signal block set B.

In combination with the second aspect or any of the above possible examples, in another possible example of the second aspect, a bit corresponding to each synchronization signal block set B in the N synchronization signal block sets B is contained in the third sub-bitmap according to an arrangement order of the synchronization signal block set A corresponding to the each synchronization signal block set B in the first sub-bitmap.

A bit corresponding to each second synchronization signal block in the synchronization signal block sets B including the third synchronization signal block is contained in the fourth sub-bitmap according to an arrangement order of the bit corresponding to the each second synchronization signal block in the second sub-bitmap.

In a third aspect, a network device is provided for performing the method in the first aspect or any possible example of the first aspect described above. Specifically, the network device includes function modules for implementing the method in the first aspect or in any possible example of the first aspect described above.

In a fourth aspect, a terminal device is provided for performing the method in the second aspect or any possible example of the second aspect described above. Specifically, the terminal device includes function modules for implementing the method in the second aspect or in any possible example of the second aspect described above.

In a fifth aspect, a network device is provided. The network device includes a processor, a memory, and a transceiver. The processor, the memory, and the transceiver communicate with each other through an internal connection path to transfer control signals, data signals, or both control signals and data signals, so that the network device performs the method in the first aspect or any possible example of the first aspect described above.

In a sixth aspect, a terminal device is provided. The terminal device includes a processor, a memory, and a transceiver. The processor, the memory, and the transceiver communicate with each other through an internal connection path to transfer control signals, data signals, or both control signals and data signals, so that the terminal device performs the method in the second aspect or any possible example of the second aspect described above.

In a seventh aspect, a computer readable medium is provided for storing a computer program. The computer program includes instructions for executing any method or the method in any possible example described above.

In an eighth aspect, a computer program product containing instructions is provided. When running on a computer, the computer program product causes the computer to execute any method or the method in any possible example described above.

BRIEF DESCRIPTION OF DRAWINGS

To describe the technical scheme of implementations of the present application more clearly, accompanying drawings that need to be used in the implementations or description for the existing art will be briefly introduced below. It is apparent that the accompanying drawings described below are only some implementations of the present application; and for a person of ordinary skill in the art, other drawings may be obtained according to these drawings without creative efforts.

DETAILED DESCRIPTION

The technical scheme in the implementations of the present application will be described below with reference to the drawings in implementations of the present application. It is apparent that the implementations described are just some implementations of the present application, and not all implementations of the present application. All the other implementations acquired by a person of ordinary skill in the art according to the implementations of the present application without creative efforts are within the protection scope of the present application.

The technical solutions of the implementations of the present application may be applied to various communication systems, such as, the Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS) system, Worldwide Interoperability for Microwave Access (WiMAX) communication system or a future 5G system.

Figure 1:
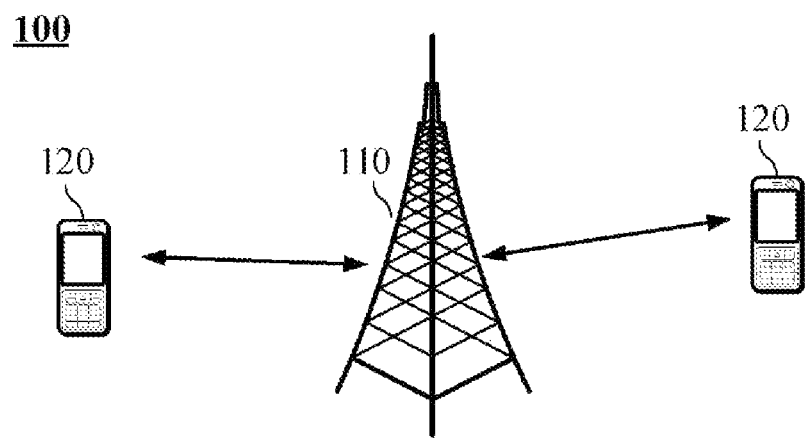
FIG. 1 is a schematic diagram of a radio communication system according to an implementation of the present application.

FIG. 1 shows a radio communication system 100 to which an implementation of the present application is applied. The radio communication system 100 may include a network device 110. The network device 110 may be a device that communicates with a terminal device. The network device 110 may provide communication coverage for a specific geographical area, and may communicate with terminal devices (e.g., UE) located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, an on-board device, or a wearable device, a network device in a future 5G network, or a network device in a future evolved Public Land Mobile Network (PLMN), etc.

The radio communication system 100 also includes at least one terminal device 120 located within the coverage area of the network device 110. The terminal device 120 may be mobile or fixed. Optionally, the terminal device 120 may be referred to an access terminal, User Equipment (UE), subscriber unit, subscriber station, mobile station, remote station, remote terminal, mobile device, user terminal, terminal, radio communication device, user agent, or user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, an on-board device, a wearable device, a terminal device in a future 5G network, or a terminal device in a future evolving Public Land Mobile Network (PLMN), or the like.

Optionally, terminal direct connection (Device to Device, D2D) communication may be performed between the terminal devices 120.

Optionally, the 5G system or network may also be referred to as a New Radio (NR) system or network.

FIG. 1 exemplifies one network device and two terminal devices. Optionally, the radio communication system 100 may include a plurality of network devices, and there may include another quantity of terminal devices within the coverage area of each network device, which is not limited by the implementations of the present application.

Optionally, the radio communication system 100 may also include other network entities such as a network controller, a mobile management entity, and implementations of the present application are not limited thereto.

It should be understood that the terms "system" and "network" are often used interchangeably herein. The term "and/or" in this document is merely an association relationship for describing associated objects, and indicates that there may be three relationships, for example, a and/or b may indicate three situations: a alone, a and b, and b alone. In addition, the symbol "/" in this document generally indicates that objects of the former and the latter connected by "/" has an "or" relationship.

In the NR system, the network device may send a Synchronization Signal burst set (SS burst set) including a plurality of SS blocks, and each SS block included in the SS burst set contains PSS, SSS, and PBCH.

Optionally, the SS burst set may be a set of SS blocks sent at a specific frequency point.

Optionally, each of a plurality of SS blocks included in one SS burst set may correspond to one sending beam.

Optionally, a sending period of the SS burst set may be 5 ms, 10 ms, 20 ms, 40 ms, 80 ms, or 160 ms.

Optionally, in one sending period of the SS burst set, all SS blocks in the SS burst set may be limited to a time window with a fixed value (e.g., 5 ms). In the time window of the SS burst set, the maximum quantity L of SS blocks that may be transmitted may be related to the specific operating frequency band. For example:

for a frequency domain range within 3 GHz, L is 4;

for the frequency domain range of 3 GHz to 6 GHz, L is 8;

for the frequency domain range of 6 GHz to 52.6 GHz, L is 64.

Optionally, in one SS burst set, the quantity of SS blocks sent by the network device may be smaller than L, which may depend on conditions, such as the quantity of implemented beams or cell radius of the network device.

Optionally, for the actually transmitted SS blocks, all or part of the SS blocks may be used for specific functions, for example, a beam management, a Radio Link Measurement (RLM), a mobility management measurement.

Figure 2:
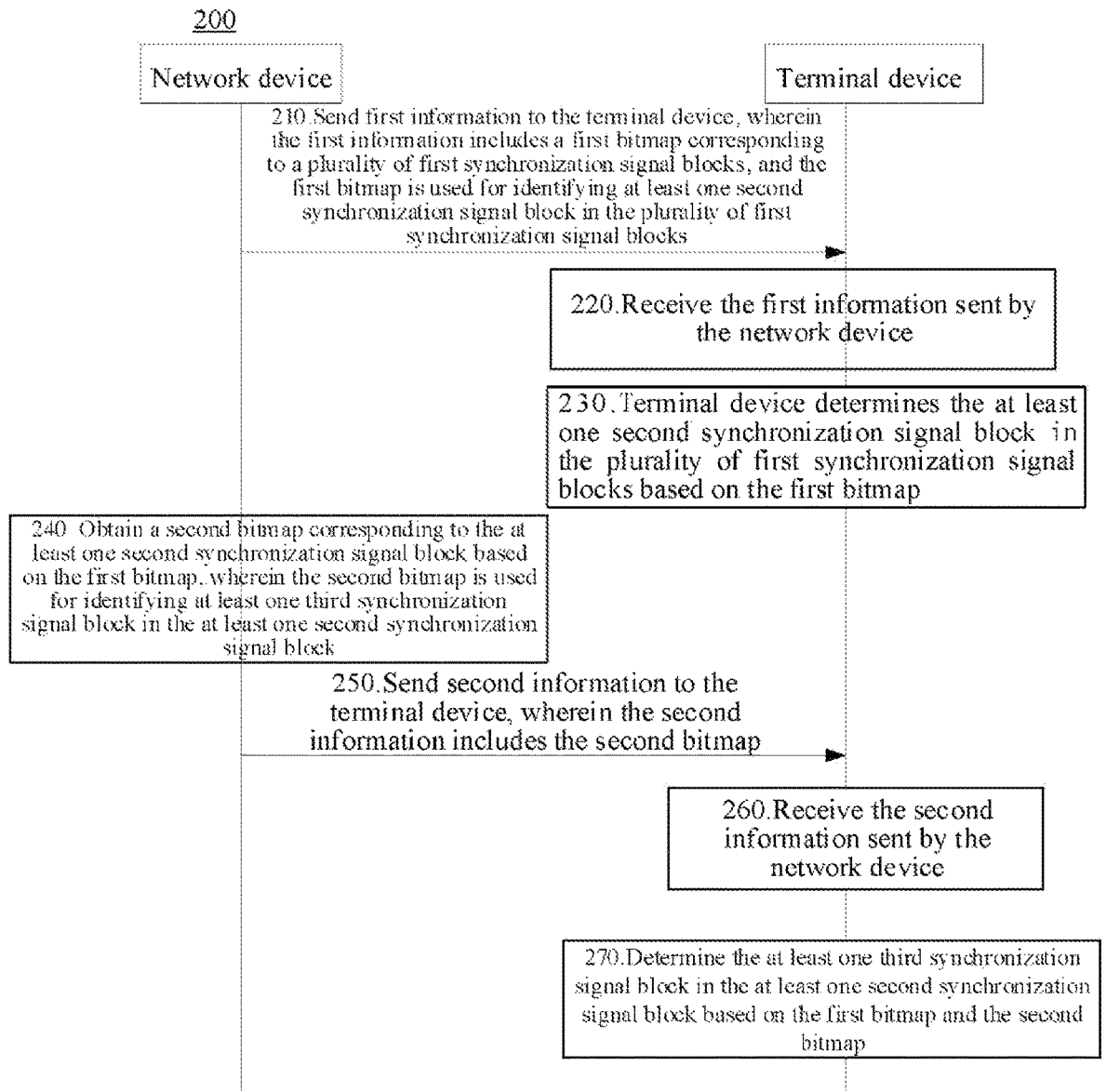
FIG. 2 is a schematic flowchart of a radio communication method according to an implementation of the present application.

FIG. 2 is a schematic flowchart of a radio communication method 200 according to an implementation of the present application. The method 200 may optionally be applied to the system shown in FIG. 1, but is not limited thereto. The method 200 includes at least some of the following contents In 210, a network device sends first information to a terminal device, wherein the first information includes a first bitmap corresponding to a plurality of first synchronization signal blocks, and the first bitmap is used for identifying at least one second synchronization signal block in the plurality of first synchronization signal blocks.

Optionally, the first bitmap corresponding to the plurality of first synchronization signal blocks refers to that the first bitmap is a bitmap which carries indication information of the first synchronization signal blocks.

Optionally, the second synchronization signal block is a specific synchronization signal block in the first synchronization signal blocks, and the first bitmap may distinguish the second synchronization signal block from the non-second synchronization signal block by using different values of indication bits.

In 220, the terminal device receives the first information sent by the network device.

Optionally, the first information may be system information, and specifically may be remaining minimum system information (RMSI). Herein, in addition to the first bitmap, RMSI may also carry other information.

Or, the first information may be carried in a Radio Resource Control (RRC) message.

In 230, the terminal device determines the at least one second synchronization signal block in the plurality of first synchronization signal blocks based on the first bitmap.

Specifically, the terminal device may determine at least one second synchronization signal block in the plurality of first synchronization signal blocks according to a bit indication of the first bitmap.

In 240, the network device obtains a second bitmap corresponding to the at least one second synchronization signal block based on the first bitmap, wherein the second bitmap is used for identifying at least one third synchronization signal block in the at least one second synchronization signal block.

Optionally, the second bitmap corresponding to the at least one second synchronization signal block refers to that the second bitmap is a bitmap which carries indication information of the second synchronization signal block.

Specifically, the network device may obtain a mapping mode of the at least one second synchronization signal block in the second bitmap according to a mapping mode of the at least one second synchronization signal block in the first bitmap; and obtain the second bitmap by using the determined mapping mode.

Herein, the mapping mode refers to how the second synchronization signal block is mapped on the first bitmap. Therefore, the second bitmap for identifying the third synchronization signal block in at least one synchronization signal block is obtained by using the mapping mode of the second synchronization signal block in the first bitmap, which is equivalent to reducing amount of information to be carried in the information to be sent by using an existing information expression, so that bit overhead may be reduced.

In 250, the network device sends second information to the terminal device, wherein the second information includes the second bitmap.

Optionally, the second information may be carried in system information, RRC signaling, or other signaling.

In 260, the terminal device receives the second information sent by the network device.

In 270, based on the first bitmap and the second bitmap, the terminal device determines the at least one third synchronization signal block in the at least one second synchronization signal block.

Specifically, the terminal device may obtain a mapping mode of the at least one second synchronization signal block in the second bitmap according to a mapping mode of the at least one second synchronization signal block in the first bitmap; and obtain the at least one third synchronization signal block in the at least one second synchronization signal block based on the second bitmap by using the determined mapping mode. Therefore, that is equivalent to using an expression of the first information to read the information in the second information, which can reduce signaling overhead.

Optionally, the plurality of first synchronization signal blocks are synchronization signal blocks that the network device is capable of sending to the terminal device at a specific frequency point.

Optionally, the at least one second synchronization signal block is at least one synchronization signal actually transmitted by the network device to the terminal device at a specific frequency point.

Optionally, the at least one third synchronization signal block is the synchronization signal block for the terminal device to perform a beam management, a radio link measurement, or a mobility management measurement.

It should be understood that the specific frequency point mentioned in implementations of the present application may include one or more frequency points.

It should also be understood that the implementations of the present application are not limited to the above limitations for the first synchronization signal block, the second synchronization signal block and the third synchronization signal block.

For example, the plurality of first synchronization signal blocks are synchronization signal blocks actually transmitted by the network device to the terminal device at the specific frequency point, the at least one second synchronization signal block is used for the terminal device to perform a beam management, and the at least one third synchronization signal block is a synchronization signal block used for a radio link measurement of the terminal device. In this case, it means that the radio link measurement may multiplex all or part of the configuration of synchronization signal blocks of the beam management.

To understand the application more clearly, the following will introduce two examples to introduce the first bitmap and the second bitmap.

In the first example, the quantity of bits in the first bitmap is equal to the quantity of the first synchronization signal blocks, and the quantity of bits in the second bitmap is equal to the quantity of the second synchronization signal blocks.

Optionally, a bit corresponding to each second synchronization signal block of the at least one second synchronization signal block in the second bitmap is contained in the second bitmap according to an arrangement order of the bit corresponding to the each second synchronization signal block in the first bitmap.

Specifically, the network device may obtain the quantity M of actually transmitted synchronization signal blocks and the synchronization signal block indexes based on the first bitmap, and notify the terminal device of SSB for RLM by using the second bitmap with a length of M.

Taking an example in which assuming that the network device may transmit up to L=8 SS blocks between 3 GHz and 6 GHz. In a case of L=8 SSBs, the network device actually transmits 4 SS blocks, and the indication bitmap in RMSI or RRC signaling is 10101010 (where 1 represents an actually transmitted synchronization signal block and 0 represents an actually untransmitted synchronization signal block).

To indicate the SS block for RLM, the network device may adopt a second bitmap with a length of 4 bits. For example, if the network device instructs a certain terminal A to use the first two of the actually sent 4 SS blocks as RLM Reference Signal (RS), the bitmap that may be used is 1100. Or, for example, if the network device instructs a certain terminal B to use the 2nd and 4th of the actually sent 4 SS blocks as RLM RS, the bitmap that may be used is 0101.

The method is similar for other frequency bands, for example, in a case that the maximum quantity L of SS blocks to transmit is 4 or 64.

In a second example, the first bitmap includes a first sub-bitmap and a second sub-bitmap; and the second bitmap includes a third sub-bitmap and a fourth sub-bitmap. The first sub-bitmap corresponds to M synchronization signal block sets A, each of which includes at least one first synchronization signal block, and the first sub-bitmap is used for identifying N synchronization signal block sets A including second synchronization signal blocks in M synchronization signal block sets A. The second sub-bitmap corresponds to the synchronization signal block sets A including the second synchronization signal block for identifying the second synchronization signal block in the synchronization signal block set A including the second synchronization signal block. The third sub-bitmap corresponds to N synchronization signal block sets B, the N synchronization signal block sets B correspond to the N synchronization signal block sets A in a one-to-one manner. Each synchronization signal block set B includes a second synchronization signal block in the corresponding synchronization signal block set A, and the third sub-bitmap is used for identifying S synchronization signal block sets B including a third synchronization signal block in the N synchronization signal block sets B. The fourth sub-bitmap corresponds to the synchronization signal block set B including the third synchronization signal block for identifying the third synchronization signal block in the synchronization signal block sets B.

It should be understood that A and B in sets A and B mentioned in the implementations of the present application are only for descriptive distinction, similar to the first and second, and should not constitute special limitations to the implementations of the present application.

Optionally, the quantity of bits in the first sub-bitmap is equal to M, and the quantity of bits in the second sub-bitmap is equal to the quantity of synchronization signal blocks included in the synchronization signal block set A; the quantity of bits in the third sub-bitmap is equal to N, and the quantity of bits in the fourth sub-bitmap is equal to the quantity of synchronization signal blocks included in the synchronization signal block set B.

Optionally, a bit corresponding to each synchronization signal block set B in the N synchronization signal block sets B is contained in the third sub-bitmap according to an arrangement order of the synchronization signal block set A corresponding to the each synchronization signal block set B in the first sub-bitmap. A bit corresponding to each second synchronization signal block in the synchronization signal block sets B including the third synchronization signal block is contained in the fourth sub-bitmap according to an arrangement order of the bit corresponding to the each second synchronization signal block in the second sub-bitmap.

Specifically, the network device may obtain the set quantity G of the actually transmitted SS blocks and the quantity N of actually transmitted SS blocks in each set based on the first sub-bitmap and the second sub-bitmap in the first bitmap notified in RMSI; and notify SSB sets for the RLM measurement by using a third sub-bitmap with a length of G, and notify SSB for the RLM measurement in each set by using a fourth sub-bitmap with a length of N.

Taking an example of the frequency band above 6 GHz, when RMSI indicates actually transmitted SS blocks, an 8-bit bitmap (also referred to as a sub-bitmap) is used to indicate actually transmitted SS block sets, and is used to indicate the actually transmitted SS blocks in all the actually transmitted SS block sets together with another 8-bit bitmap (also referred to as a sub-bitmap).

Assuming in an actual example situation, the network device uses 11001100 to indicate actually transmitted SS block sets, and at the same time uses 10011000 to indicate actually transmitted SS blocks in the SS block set, then the indication of the actually transmitted SS blocks in each set shares 10011000.

Then the network device may notify the SS block for RLM by using the following manner: using a 4-bit bitmap (also referred to as a sub-bitmap) to indicate the SS block set for RLM-RS, using a 3-bit bitmap to indicate the actual SS blocks for RLM-RS in the SS block set for RLM-RS, for example, the bit map for notifying SS blocks for RLM is 1100+110.

Therefore, in the above two specific examples, the network device may combine the indication of the actually transmitted SS blocks by RMSI or RRC signaling, and use a shorter bitmap to indicate the SS block for RLM measurement to the terminal, which can reduce signaling overhead.

The above has introduced two ways of carrying the second bitmap, and implementations of the present application are not limited thereto.

Optionally, among a plurality of indication modes of the at least one third synchronization signal block, a bit overhead by using the second bitmap to indicate the at least one third synchronization signal block is least, or is less than or equal to a predetermined value.

Herein, a plurality of indication modes include: indicating by using the second bitmap; and indicating by carrying the serial-number of the at least one third synchronization signal block.

Specifically, indicating the terminal device the SS block for RLM-RS may also adopt a mode of indicating an SS block index. Assuming that the bit overhead for indicating one SS block index is Y bits (where Y depends on L, for example, assuming L is 64, then the bit overhead of one SS block index may be 6 bits). If the quantity of SS for RLM-RS indicated by the network device to the terminal is N, then the total bit overhead by the mode of indicating the SS block index is N*Y bits.

Assuming that the bit overhead of the above-mentioned first or second example is X bits, when X>=N*Y, the mode of indicating the SS block index may be selected, otherwise, the above-mentioned first or second example may be adopted.

The specific mode used may be preset directly on the network device and the terminal device, or may be selected by the network device, and the network device may indicate to the terminal device in high-level signaling, for example, by a 1-bit indication. For example, Indication may be in RRC signaling or a broadcast message.

In this scheme, among the plurality of indication modes of synchronization signal block, the indication mode with less bit overhead may be adopted to further reduce signaling overhead.

To sum up, in implementations of the present application, an expression of the first bitmap, used for identifying at least one second synchronization signal block in the plurality of first synchronization signal blocks, corresponding to the plurality of first synchronization signal blocks is used, so that the second bitmap can identify at least one third synchronization signal block in the at least one second synchronization signal block, thus be capable of reducing signaling overhead.

Figure 3:
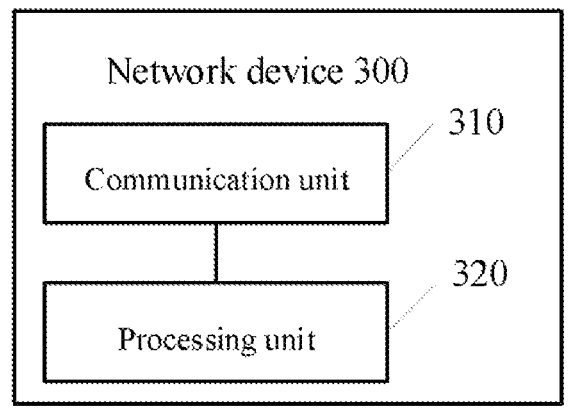
FIG. 3 is a schematic block diagram of a network device according to an implementation of the present application.

FIG. 3 is a schematic block diagram of a network device 300 according to an implementation of the present application. As shown in FIG. 3, the network device 300 includes a communication unit 310 and a processing unit 320. The communication unit 310 is used for sending first information to a terminal device, wherein the first information includes a first bitmap corresponding to a plurality of first synchronization signal blocks, and the first bitmap is used for identifying at least one second synchronization signal block in the plurality of first synchronization signal blocks. The processing unit 320 is used for obtaining a second bitmap corresponding to the at least one second synchronization signal block based on the first bitmap, and the second bitmap is used for identifying at least one third synchronization signal block in the at least one second synchronization signal block. The communication unit 310 is further used for sending second information to the terminal device, and the second information includes the second bitmap.

It should be understood that the network device 300 may correspond to the network device in the method implementations and may implement corresponding operations implemented by the network device in the method implementations. For the sake of brevity, those will not be repeated here.

Figure 4:
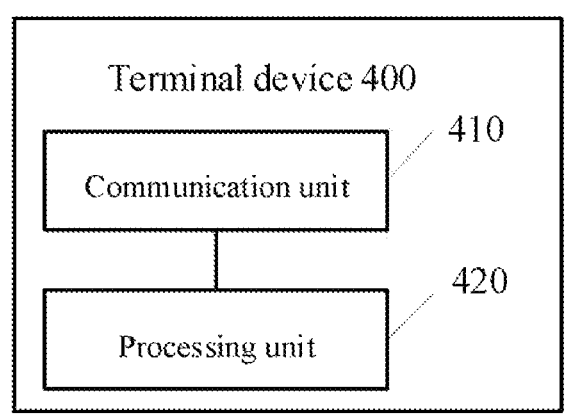
FIG. 4 is a schematic block diagram of a terminal device according to an implementation of the present disclosure.

FIG. 4 is a schematic block diagram of a terminal device 400 according to an implementation of the present disclosure. As shown in FIG. 4, the terminal device 400 includes a processing unit 420 and a communication unit 410. The communication unit 410 is used for receiving first information sent by a network device, wherein the first information includes a first bitmap corresponding to a plurality of first synchronization signal blocks, and the first bitmap is used for identifying at least one second synchronization signal block in the plurality of first synchronization signal blocks. The processing unit 420 is used for determining the at least one second synchronization signal block in the plurality of first synchronization signal blocks based on the first bitmap. The communication unit 410 is further used for receiving second information sent by the network device, wherein the second information includes a second bitmap corresponding to the at least one second synchronization signal block, and the second bitmap is used for identifying at least one third synchronization signal block in the at least one second synchronization signal block. The processing unit 420 is further used for determining the at least one third synchronization signal block in the at least one second synchronization signal block based on the first bitmap and the second bitmap.

It should be understood that the terminal device 400 may correspond to the terminal device in the method implementations and may implement corresponding operations implemented by the terminal device in the method implementations. For the sake of brevity, those will not be repeated here.

Figure 5:
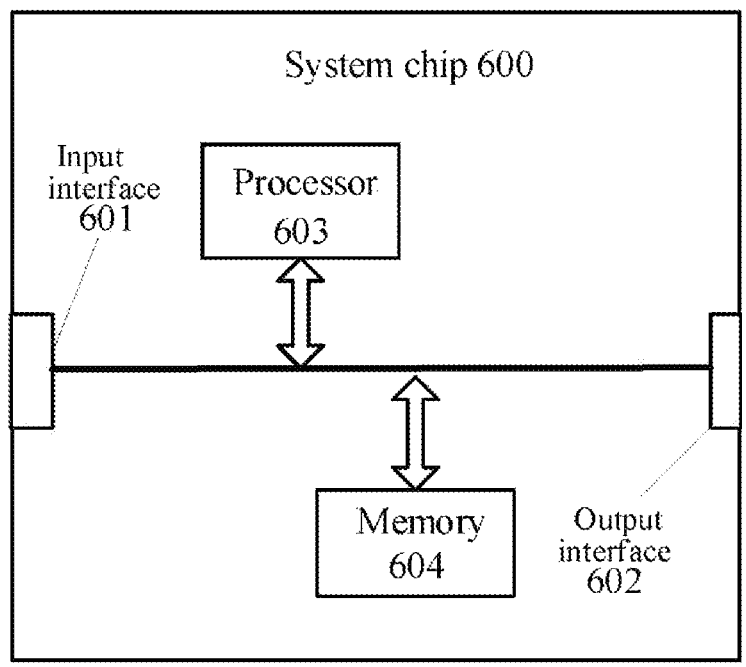
FIG. 5 is a schematic diagram of a system chip according to an implementation of the present disclosure.

FIG. 5 is a schematic structural diagram of a system chip 600 according to an implementation of the present disclosure. The system chip 600 of FIG. 5 includes an input interface 601, an output interface 602, a processor 603, and a memory 604, which could be connected through internal communication connection lines. The processor 603 is used for executing codes in the memory 604.

Optionally, when the code is executed, the processor 603 implements the method implemented by the network device in the method implementations. For the sake of brevity, it will not be repeated here.

Optionally, when the code is executed, the processor 603 implements the method implemented by the terminal device in the method implementations. For the sake of brevity, it will not be repeated here.

Figure 6:
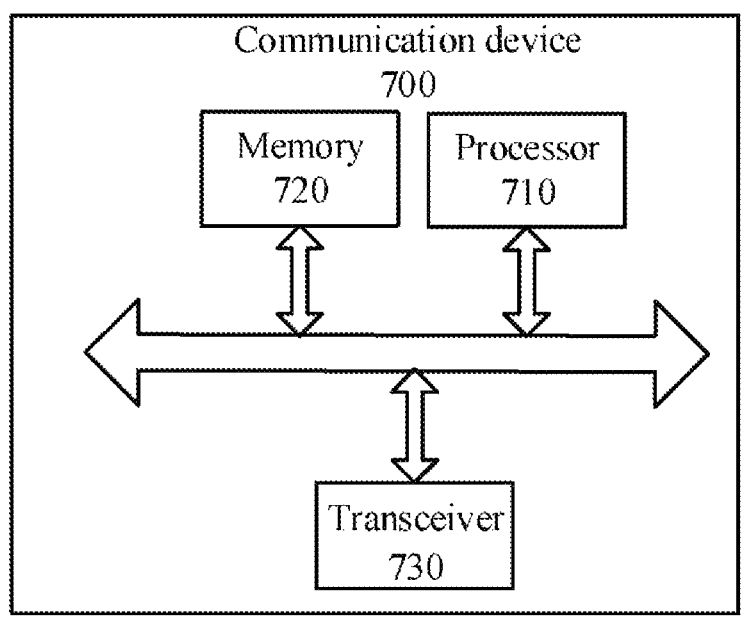
FIG. 6 is a schematic block diagram of a communication device according to an implementation of the present application.

FIG. 6 is a schematic block diagram of a communication device 700 according to an implementation of the present application. As shown in FIG. 6, the communication device 700 includes a processor 710 and a memory 720. The memory 720 may store program codes, and the processor 710 may execute the program codes stored in the memory 720.

Optionally, as shown in FIG. 6, the communication device 700 may include a transceiver 730, and the processor 710 may control the transceiver 730 to communicate with the external.

Optionally, the processor 710 may call the program codes stored in the memory 720 to perform corresponding operations of the network device in the method implementations, which will not be described here repeatedly for brevity.

Optionally, the processor 710 may call the program codes stored in the memory 720 to perform corresponding operations of the terminal device in the method implementations, which will not be described here repeatedly for brevity.

It should be understood that the processor in an implementation of the present disclosure may be an integrated circuit chip with a capability for processing signals. In the example process, the actions of the method implementations described above may be completed by integrated logic circuits of hardware in the processor or instructions in the form of software. The above processor may be a general purpose processor, a digital signal processor (DSP), an application specific integrated circuit (ASIC), a field programmable gate array (FPGA) or other programmable logic devices, a discrete gate or transistor logic device, or a discrete hardware component. The processor may implement various methods, acts and logic block diagrams disclosed in implementations of the present application. The general purpose processor may be a microprocessor or the processor may be any conventional processor or the like. The actions of the method disclosed in connection with the implementation of the present application may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the actions of the above method in combination with its hardware.

It should be understood that the memory in implementations of the present application may be a transitory memory or non-transitory memory, or may include both transitory and non-transitory memory. The non-transitory memory may be a read-only memory (ROM), programmable ROM (PROM), erasable programmable ROM (EPROM), electrically erasable programmable ROM (EEPROM) or flash memory. The transitory memory may be a random access memory (RAM) which serves as an external cache. By way of example, but not limitation, many forms of RAMs are available, such as, a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM) and a direct Direct Rambus RAM (DR RAM). It should be noted that the memories of the systems and methods described herein are intended to include, but are not limited to, these and any other suitable types of memories.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such example should not be considered to be beyond the scope of the present disclosure.

Those skilled in the art can clearly understand that for convenience and conciseness of description, the specific working processes of the system, device and unit described above may refer to the corresponding processes in the aforementioned method implementations and will not be described here.

In several implementations provided by the present application, it should be understood that the disclosed systems, devices and methods may be implemented in other ways. For example, the device implementations described above are only exemplary, for example, the division of the units is only a logical function division, and there may be other division modes in actual example, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate unit may or may not be physically separated, and the unit shown as a unit may or may not be a physical unit, i.e., it may be located in one place or may be distributed over multiple network units. Some or all of the elements can be selected according to actual needs to achieve the purpose of the implementations.

In addition, various functional units in various implementations of the present application may be integrated in one processing unit, or they may be physically present in each unit alone, or two or more units may be integrated in one unit.

The functions may be stored in a computer readable storage medium if implemented in the form of software functional units and sold or used as separate products. Based on this understanding, the technical solution of the present application, in essence, or the part contributing to the prior art, or the part of the technical solution, may be embodied in the form of a software product stored in a storage medium, including a variety of instructions for causing a computer device (which may be a personal computer, a server, or a network device) to perform all or part of the acts of the method described in various implementations of the present application. The aforementioned storage medium includes various media capable of storing program codes, such as a U disk, a mobile hard disk, a read-only memory (ROM), a random access memory (RAM), a magnetic disk, or an optical disk.

What are described above are merely exemplary implementations of the present application, but the protection scope of the present application is not limited thereto. Any change or substation that can be easily conceived by a person skilled in the art within the technical scope disclosed by the present application shall be included within the protection scope of the present application. Therefore, the protection scope of the present application shall be the protection scope defined by the claims.

What is claimed is:

1. A radio communication method, comprising:
   receiving, by a terminal device, first information sent by a network device, wherein the first information comprises a first bitmap corresponding to a plurality of first synchronization signal blocks, and the first bitmap is used for identifying at least one second synchronization signal block in the plurality of first synchronization signal blocks;
   determining, by the terminal device, the at least one second synchronization signal block in the plurality of first synchronization signal blocks based on the first bitmap;
   receiving, by the terminal device, second information sent by the network device, wherein the second information comprises a second bitmap corresponding to the at least one second synchronization signal block, and the second bitmap is used for identifying at least one third synchronization signal block in the at least one second synchronization signal block;
   determining the at least one third synchronization signal block in the at least one second synchronization signal block based on the first bitmap and the second bitmap,
   wherein a quantity of bits in the first bitmap is equal to the quantity of the first synchronization signal blocks, and the quantity of bits in the second bitmap is equal to the quantity of the second synchronization signal blocks, and
   wherein a bit corresponding to each second synchronization signal block of the at least one second synchronization signal block in the second bitmap is contained in the second bitmap according to an arrangement order of the bit corresponding to the each second synchronization signal block in the first bitmap.

2. The method according to claim 1, wherein the plurality of first synchronization signal blocks are synchronization signal blocks that the network device is capable of sending to the terminal device at a specific frequency point.

3. The method according to claim 1, wherein the at least one second synchronization signal block is synchronization signal block actually transmitted by the network device to the terminal device at a specific frequency point.

4. The method according to claim 1, wherein the at least one third synchronization signal block is synchronization signal block for the terminal device to perform a beam management, a radio link measurement, or a mobility management measurement.

5. The method according to claim 1, wherein determining the at least one third synchronization signal block in the at least one second synchronization signal block based on the first bitmap and the second bitmap comprises:
   obtaining a mapping mode of the at least one second synchronization signal block in the second bitmap according to a mapping mode of the at least one second synchronization signal block in the first bitmap;
   obtaining the at least one third synchronization signal block in the at least one second synchronization signal block based on the second bitmap by using a determined mapping mode.

6. The method according to claim 1, wherein the first bitmap comprises a first sub-bitmap and a second sub-bitmap; and the second bitmap comprises a third sub-bitmap and a fourth sub-bitmap;
   the first sub-bitmap corresponds to M synchronization signal block sets A, each of which comprises at least one first synchronization signal block, and the first sub-bitmap is used for identifying N synchronization signal block sets A comprising the second synchronization signal block in the M synchronization signal block sets A;
   the second sub-bitmap corresponds to the synchronization signal block sets A comprising the second synchronization signal block, and is used for identifying the second synchronization signal block in the synchronization signal block sets A comprising the second synchronization signal block;
   the third sub-bitmap corresponds to N synchronization signal block sets B, the N synchronization signal block sets B correspond to the N synchronization signal block sets A in a one-to-one manner, each synchronization signal block set B comprises the second synchronization signal block in the corresponding synchronization signal block set A, and the third sub-bitmap is used for identifying S synchronization signal block sets B comprising the third synchronization signal block in the N synchronization signal block sets B;
   the fourth sub-bitmap corresponds to the synchronization signal block sets B comprising the third synchronization signal block, and is used for identifying the third synchronization signal block in the synchronization signal block sets B.

7. The method according to claim 6, wherein a quantity of bits in the first sub-bitmap is equal to M, and the quantity of bits in the second sub-bitmap is equal to the quantity of synchronization signal blocks comprised in the synchronization signal block set A;
   the quantity of bits in the third sub-bitmap is equal to N, and the quantity of bits in the fourth sub-bitmap is equal to the quantity of synchronization signal blocks comprised in the synchronization signal block set B.

8. The method according to claim 7, wherein a bit corresponding to each synchronization signal block set B in the N synchronization signal block sets B is contained in the third sub-bitmap according to an arrangement order of the synchronization signal block set A corresponding to the each synchronization signal block set B in the first sub-bitmap;
   a bit corresponding to each second synchronization signal block in the synchronization signal block sets B comprising the third synchronization signal block is contained in the fourth sub-bitmap according to an arrangement order of the bit corresponding to the each second synchronization signal block in the second sub-bitmap.

9. A terminal device, comprising a processor and a memory, wherein the memory stores program codes, the processor is used for executing the program codes stored in the memory to:
receive first information sent by a network device, wherein the first information comprises a first bitmap corresponding to a plurality of first synchronization signal blocks, and the first bitmap is used for identifying at least one second synchronization signal block in the plurality of first synchronization signal blocks;
determine the at least one second synchronization signal block in the plurality of first synchronization signal blocks based on the first bitmap;
receive second information sent by the network device, wherein the second information comprises a second bitmap corresponding to the at least one second synchronization signal block, and the second bitmap is used for identifying at least one third synchronization signal block in the at least one second synchronization signal block; and
determine the at least one third synchronization signal block in the at least one second synchronization signal block based on the first bitmap and the second bitmap,
wherein a quantity of bits in the first bitmap is equal to the quantity of the first synchronization signal blocks, and the quantity of bits in the second bitmap is equal to the quantity of the second synchronization signal blocks, and
wherein a bit corresponding to each second synchronization signal block of the at least one second synchronization signal block in the second bitmap is contained in the second bitmap according to an arrangement order of the bit corresponding to the each second synchronization signal block in the first bitmap.

10. The terminal device according to claim 9, wherein the plurality of first synchronization signal blocks are synchronization signal blocks that the network device is capable of sending to the terminal device at a specific frequency point.

11. The terminal device according to claim 9, wherein the at least one second synchronization signal block is synchronization signal block actually transmitted by the network device to the terminal device at a specific frequency point.

12. The terminal device according to claim 9, wherein the at least one third synchronization signal block is synchronization signal block for the terminal device to perform a beam management, a radio link measurement, or a mobility management measurement.

13. The terminal device according to claim 9, wherein the processor is used for executing the program codes stored in the memory to:
obtain a mapping mode of the at least one second synchronization signal block in the second bitmap according to a mapping mode of the at least one second synchronization signal block in the first bitmap;
obtain the at least one third synchronization signal block in the at least one second synchronization signal block based on the second bitmap by using a determined mapping mode.

14. The terminal device according to claim 9, wherein the first bitmap comprises a first sub-bitmap and a second sub-bitmap; and the second bitmap comprises a third sub-bitmap and a fourth sub-bitmap;
the first sub-bitmap corresponds to M synchronization signal block sets A, each of which comprises at least one first synchronization signal block, and the first sub-bitmap is used for identifying N synchronization signal block sets A comprising the second synchronization signal block in the M synchronization signal block sets A;
the second sub-bitmap corresponds to the synchronization signal block sets A comprising the second synchronization signal block, and is used for identifying the second synchronization signal block in the synchronization signal block sets A comprising the second synchronization signal block;
the third sub-bitmap corresponds to N synchronization signal block sets B, the N synchronization signal block sets B correspond to the N synchronization signal block sets A in a one-to-one manner, each synchronization signal block set B comprises the second synchronization signal block in the corresponding synchronization signal block set A, and the third sub-bitmap is used for identifying S synchronization signal block sets B comprising the third synchronization signal block in the N synchronization signal block sets B;
the fourth sub-bitmap corresponds to the synchronization signal block sets B comprising the third synchronization signal block, and is used for identifying the third synchronization signal block in the synchronization signal block sets B.

15. The terminal device according to claim 14, wherein a quantity of bits in the first sub-bitmap is equal to M, and the quantity of bits in the second sub-bitmap is equal to the quantity of synchronization signal blocks comprised in the synchronization signal block set A;
the quantity of bits in the third sub-bitmap is equal to N, and the quantity of bits in the fourth sub-bitmap is equal to the quantity of synchronization signal blocks comprised in the synchronization signal block set B.

16. A non-transitory computer readable medium, containing instructions which, when being executed on a computer, enables the computer to:
receive first information sent by a network device, wherein the first information comprises a first bitmap corresponding to a plurality of first synchronization signal blocks, and the first bitmap is used for identifying at least one second synchronization signal block in the plurality of first synchronization signal blocks;
determine the at least one second synchronization signal block in the plurality of first synchronization signal blocks based on the first bitmap;
receive second information sent by the network device, wherein the second information comprises a second bitmap corresponding to the at least one second synchronization signal block, and the second bitmap is used for identifying at least one third synchronization signal block in the at least one second synchronization signal block; and
determine the at least one third synchronization signal block in the at least one second synchronization signal block based on the first bitmap and the second bitmap,
wherein a quantity of bits in the first bitmap is equal to the quantity of the first synchronization signal blocks, and the quantity of bits in the second bitmap is equal to the quantity of the second synchronization signal blocks, and
wherein a bit corresponding to each second synchronization signal block of the at least one second synchronization signal block in the second bitmap is contained in the second bitmap according to an arrangement order of the bit corresponding to the each second synchronization signal block in the first bitmap.

* * * * *